United States Patent [19]

Moss

[11] 4,353,445
[45] Oct. 12, 1982

[54] TOOTHED BELT DRIVE TRANSMISSION FOR PUMPING UNITS

[76] Inventor: Robert J. Moss, 6319 S. Inwood Rd., Shreveport, La. 71119

[21] Appl. No.: 164,780

[22] Filed: Jun. 30, 1980

[51] Int. Cl.³ .............................................. B60K 41/20
[52] U.S. Cl. ..................................... 192/4 R; 474/150
[58] Field of Search ........................... 192/4 R, 11, 2; 474/148, 150, 249, 205, 88; 74/41

[56] References Cited

U.S. PATENT DOCUMENTS

| | | | |
|---|---|---|---|
| 2,310,393 | 2/1943 | Carter | 74/41 |
| 2,579,112 | 12/1951 | Fullerton | 74/41 |
| 3,828,844 | 8/1974 | Kitano | 474/149 |
| 4,175,645 | 11/1979 | Brinkert | 192/2 |
| 4,238,966 | 12/1980 | Carlson et al. | 74/41 |

*Primary Examiner*—George H. Krizmanich

[57] ABSTRACT

A toothed belt drive transmission for pumping units in the oil field which includes a frame and base fitted with a drive pulley on a drive shaft, intermediate and crank shafts, and tandem-mounted belt sprockets with cooperating toothed belts for transmitting power from a drive source to the walking beam of a pumping unit. A conventional drive pulley is carried by a drive shaft rotatably mounted on the pumping unit frame and driven by a motive force by means of one or more V-belts. A drive belt sprocket is also mounted on the drive shaft above and in alignment with an intermediate-to-drive belt sprocket which is mounted on an intermediate shaft, and cooperates in rotation with the drive belt sprocket by means of a first toothed belt. The intermediate shaft is journalled for rotation in the frame and carries an intermediate-to-crank belt sprocket which is aligned with a crank belt sprocket of larger diameter than the intermediate-to-crank belt sprocket, and is rotatably mounted on a third shaft. The crank belt sprocket cooperates with the intermediate-to-crank belt sprocket by means of a second toothed belt, and the third shaft is provided with crank arms and pitmans, the latter of which are pivotally carried by the walking beam to effect reciprocation of a wireline bridle attached to the pumping unit horsehead.

10 Claims, 6 Drawing Figures

U.S. Patent    Oct. 12, 1982    4,353,445
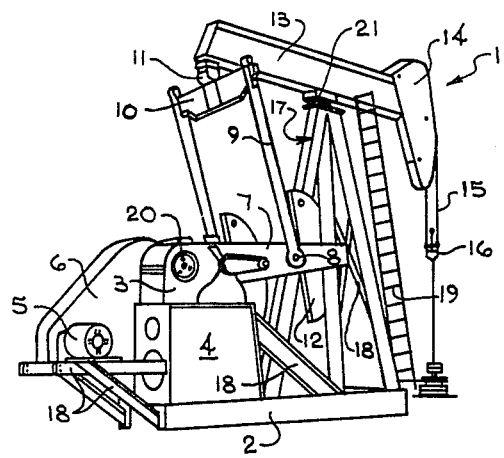
FIG. 1
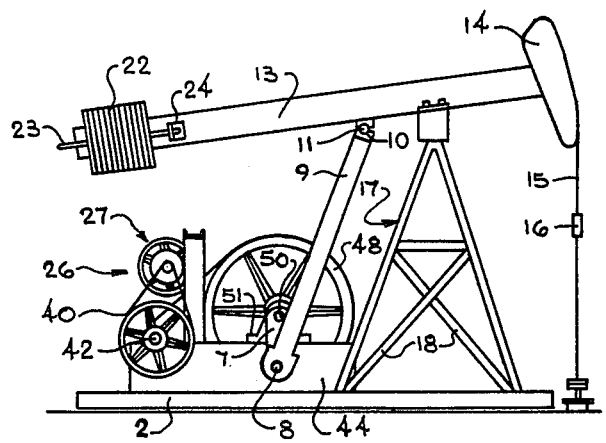
FIG. 2
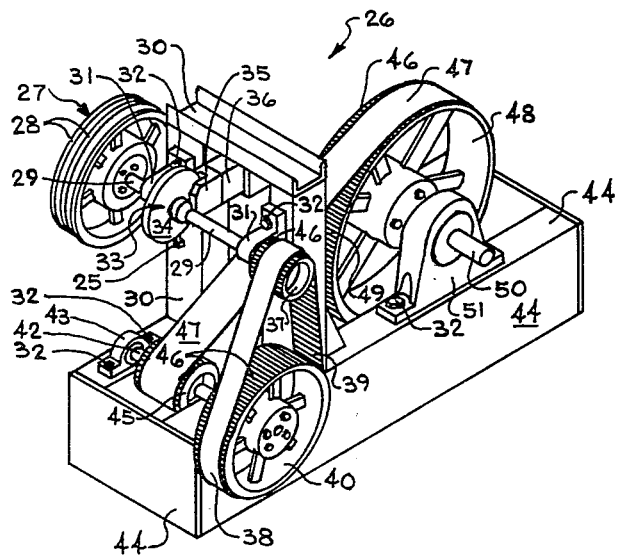
FIG. 3
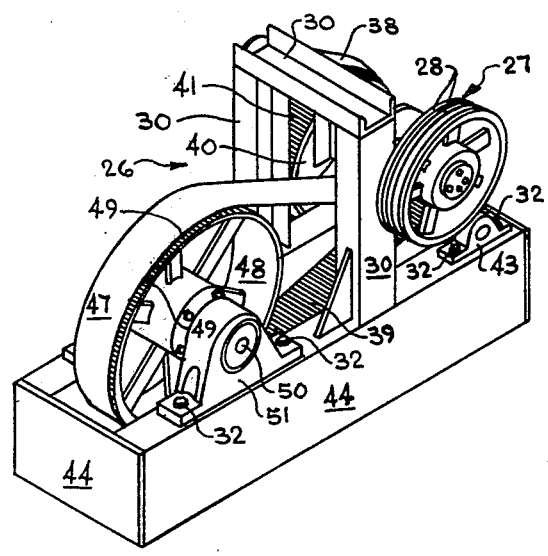
FIG. 4
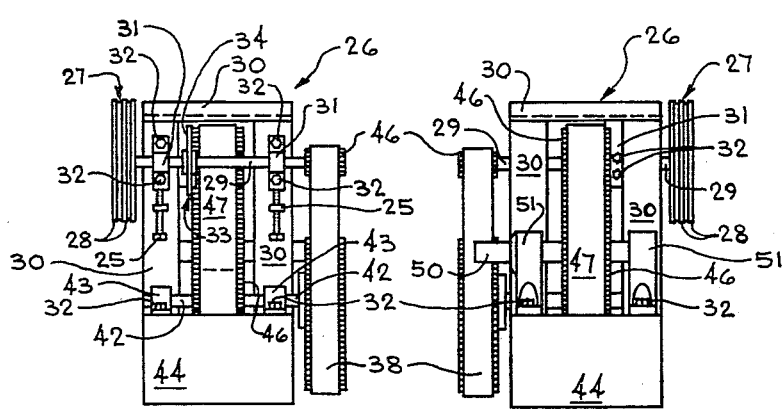

TOOTHED BELT DRIVE TRANSMISSION FOR PUMPING UNITS

BACKGROUND OF THE INVENTION

1. Field of the Invention

This invention relates to pumping units in the oil field, and more particularly, to a toothed belt-driven power transmission which eliminates the need for a gear box in transmitting power from a power source to the walking beam of a pumping unit. The toothed belt drive transmission of this invention is characterized by multiple toothed belt sprockets which cooperate by means of a pair of toothed belts in order to effect smooth, efficient, positive and quiet transmission of power from a motive force to the walking beam of the pumping unit in order to facilitate reciprocation of the wireline bridle and ultimately, the sucker rod string. The power transmission of this invention requires no lubrication except in the conventional pillar block units where the bearings are located, and is characterized by reduced maintenance costs since the toothed belts are much less expensive to replace than conventional gears mounted in gear reducing boxes and currently used to transmit power from a drive source to the walking beam in conventional pumping units.

2. Description of the Prior Art

The pumping units used to pump oil from oil bearing strata or intervals in the oil field have been known for years. Such pumping units are typically characterized by a drive means or motive force, such as an electric motor, which cooperates with the drive pulley of single, double and even triple reduction gear units to effect pivotal motion of a generally horizontally disposed walking beam and horsehead, which in turn causes a wireline bridle attached to a string of sucker rods to reciprocate and pump oil from the strata. The gear box typically carries a pair of cranks and cooperating pitmans which are pivotally attached to the walking beam and cause the walking beam horsehead to reciprocate at a selected rate.

The conventional gear-reducing units provided in pumping units for transmission of primary drive power to the pitmans and walking beams at a controlled rate are relatively complex mechanisms generally characterized by multiple gears provided in an enclosed housing and partially immersed in a pool of up to several hundred gallons of oil for lubrication. As long as the oil is maintained at the proper level within the housing, the slow speed gear of the gear-reducing units is partially immersed in the oil and receives and disperses continuous lubrication. In most cases the lubricating oil composition in the gear-reducing unit must be carefully prescribed for any given installation. For example, for temperatures down to about 0° Farenheit, An AGMA 5EP premium, mild extreme pressure lubricant, which is preferably characterized by a sulphur-phosphorous composition with rust and oxidation inhibitors and an anti-foam agent, is frequently used. If the temperature is expected to drop below 30° Farenheit at the installation, An AGMA 4EP premium mild extreme pressure lubricant is generally specified. In any case, the lubricating oil level must be maintained above the low mark on the oil indicating gauge, but should not be filled above the high mark. Furthermore, at least every six months the operator must collect a sample of the oil in a glass jar and check it for possible dirt, sludge, water emulsion or other forms of contamination. Due to the complexity of the herringbone gear units, for example, if a gear breaks or the unit fails for other reasons such as lack of sufficient lubricating oil or oil of a particular composition, the pumping unit is rendered inoperative until the gear reducing unit is replaced or the defective part is replaced in the unit. Furthermore, both the high speed and the low speed gears in the gear reducer, as well as other parts in the unit are quite expensive and add to the cost of maintaining and operating the pumping unit over a period of time. Failure of gears in gear reducing units is quite common due to the lack of resistance to shock and the large load applied to the engaged teeth.

Accordingly, it is an object of this invention to provide a new and improved system for transmitting power from a drive source to the cranks, pitmans, and walking beam of both crank weighted and beam weighted pumping units, which system is simple in design, relatively inexpensive and which operates smoothly, quietly and efficiently, and therefore facilitates lower peak loads and longer sucker rod life.

Another object of this invention is to provide a new and improved power transmission pumping unit in the oil field which eliminates the need for reduction gear units and expensive gears, and requires no lubrication except on the conventional pillar block bearings, and which is characterized by four belt sprockets having multiple teeth for engagement with matching grooves in a pair of flexible, toothed belts to effect transmission of power from a drive means to the cranks, and ultimately to the walking beam of the pumping unit.

Yet another object of the invention is to provide a new and improved power transmission means for driving pumping units in the oil field which includes four belt sprockets, each of which is provided with multiple teeth and cooperating matching flexible, endless toothed belts for lubrication-free transmission of power from the drive means to the cranks of the pumping unit, which transmission is characterized by quiet, rugged, generally maintenance-free, dependable and efficient operation.

A still further object of this invention is to provide a new and improved toothed belt drive transmission for pumping units in the oil field which requires no lubrication except that necessary in conventional pillar block bearings, and which utilizes four belt sprockets provided with multiple teeth, and a pair of cooperating flexible, endless toothed belts for achieving quiet, smooth, slippage-free and efficient transmission of power from the drive unit to the crank of the pumping unit at a selected speed ratio.

Another object of the invention is to provide a simple, yet rugged and dependable toothed belt drive transmission for pumping units which combines the strength of meshing gears with the quietness of flexible, endless toothed belt drives to achieve a highly efficient mechanism for transmission of high speed input power to low speed output power at selected ratios.

SUMMARY OF THE INVENTION

These and other objects of the invention are provided in a new and improved toothed belt drive transmission for transmitting power from a motive force drive means to the crank and ultimately to the walking beam of a pumping unit in the oil field, which transmission includes four belt sprockets of dissimilar size, each fitted with multiple teeth, and a pair of cooperating flexible, toothed belts, which belt sprockets are rotated by a drive pulley of selected size to effect smooth, quiet, slippage-free, efficient transmission of high speed power at a selected speed ratio from the drive pulley to low speed power at the cranks without the requirement of lubrication other than lubrication of the pillar block bearings in which the belt sprocket shafts are journalled for rotation.

BRIEF DESCRIPTION OF THE DRAWING

FIG. 1 of the drawing is a perspective view of a popular conventional pumping unit currently used in the oil field;

FIG. 2 is a side elevational of the toothed belt drive transmission of this invention installed in a pumping unit;

FIG. 3 is a rear perspective view of the toothed belt drive transmission illustrated in FIG. 2 with the cranks and pitmans removed and with protective top covers (not illustrated) removed;

FIG. 4 is a front perspective view of the toothed belt drive transmission illustrated in FIG. 3;

FIG. 5 is a rear elevation of the toothed belt drive transmission illustrated in FIG. 3; and FIG. 6 is a front elevation of the toothed belt drive transmission illustrated in FIG. 4.

DESCRIPTION OF THE PREFERRED EMBODIMENTS

Referring to FIG. 1 of the drawing, a conventional pumping unit commonly used to pump oil from oil-bearing strata is generally designated by reference numeral 1. Conventional pumping unit 1 is supported by a base 2, upon which is mounted a gear reducer mount 4, carrying a gear reducer 3. A drive motor 5 rests on braces 18 attached to base 2 and gear reducer mount 4, respectively, and drives a conventional drive pulley by means of a V-belt, which pulley and belt are shrouded by a belt cover 6. Gear reducer 3 is characterized by multiple, internally mounted gears, the largest of which drives cranks 7, provided with crank counter-weights 12, which cranks are pivotally fitted to pitmans 9 by means of crank pin bearings 8. Pitmans 9 are in turn attached to an equalizer or cross yoke 10, which is pivotally carried by an equalizer bearing 11, attached to walking beam 13. Walking beam 13 is also pivotally attached to a samson post 17 by means of a center bearing 21, and carries a horsehead 14 at one end, which is in turn fitted with a wireline bridle 15 and a carrier bar 16. Braces 18 serve to support samson post 17, and a ladder 19 provides access to walking beam 13 and horsehead 14 for maintenance. A brake 20 is also provided in cooperation with gear reducer 3 to stop the reciprocation of walking beam 13 and horsehead 14 when it is desired to shut down conventional pumping unit 1.

Referring now to FIGS. 2-6, a pumping unit incorporating the toothed belt drive transmission 26 of this invention is illustrated, with a base frame 44 mounted on base 2 and carrying an upward standing vertical frame 30. A drive shaft 29 is journalled for rotation in a pair of drive shaft pillar bearings 31 mounted on vertical frame 30 by means of mount bolts 32. A drive pulley 27 is mounted on one end of drive shaft 29, and is fitted with a pair of pulley grooves 28 for cooperation with a pair of V-belts, not illustrated. Drive pulley 27 is rotationally driven by the V-belts in cooperation with a motive force such as the electric drive motor 5, illustrated in FIG. 1. A drive belt sprocket 37 is mounted on the opposite end of drive shaft 29 from drive pulley 27, and is provided with spaced teeth 46 of selected pitch for meshing with the belt grooves 39 of drive toothed belt 38. Drive toothed belt 38 also cooperates with teeth 46 of intermediate-to-drive belt sprocket 40, which is mounted on intermediate shaft 42, positioned immediately below drive shaft 29. Teeth 46 of intermediate-to-drive belt sprocket 40 are characterized by the same pitch as teeth 46 of drive belt sprocket 37 to insure smooth and efficient meshing with belt grooves 39 of drive toothed belt 38. Intermediate shaft 42 is in turn journalled for rotation in intermediate shaft pillar bearings 43, mounted on base frame 44 by means of mount bolts 32. An intermediate-to-crank belt sprocket 45 is fitted to intermediate shaft 42 between intermediate shaft pillar bearings 43, and is provided with additional teeth 46 of specified pitch for meshing with the belt grooves 39 of intermediate toothed belt 47. The belt grooves 39 of intermediate toothed belt 47 also cooperate with the teeth 46 of crank belt sprocket 48, which is mounted on a crank shaft 50 in crank shaft pillar bearings 51, responsive to the rotation of intermediate-to-crank belt sprocket 45. The teeth 46 of crank belt sprocket 48 conform in pitch to teeth 46 of intermediate-to-crank belt sprocket 45.

Referring specifically to FIG. 2 of the drawing, a pair of cranks 7 are rotatably attached to ends of crank shaft 50, and rotatably carry pitmans 9 by means of crank pin bearings 8. As in the case of the conventional pumping unit 1 illustrated in FIG. 1, the opposite end of pitmans 9 are attached to an equalizer 10, pivotally carried by walking beam 13 on an equalizer bearing 11. In the pumping unit illustrated in FIG. 2, counter-weights 22 are secured to walking beam 13 by means of bar brackets 24 and bolt rods 23.

Referring again to FIGS. 3 and 5 of the drawing in a preferred embodiment of the invention a disk brake 33 is provided in toothed belt drive transmission 26 to prevent the reciprocation of walking beam 13 when necessary. Disk brake 33 is characterized by a brake rotor 34, mounted on drive shaft 29 and rotating with the shaft responsive to rotation of drive pulley 27. A brake caliper 35 is mounted on a brake mount 36, carried by vertical frame 30, and cooperates with the rotating brake rotor 34 in normally open, registering configuration during normal operation of the toothed belt drive transmission 26. When it is desired to stop the reciprocating action of walking beam 13, a brake lever and linkage (not illustrated) mounted in mechanical cooperation with the brake calipers 35, are manipulated and the brake caliper 35 close against brake rotor 34 to stop the rotation of drive pulley 27, drive shaft 29, intermediate shaft 42, and crank shaft 50 to terminate the reciprocation of walking beam 13.

It will be appreciated by those skilled in the art that the size of drive pulley 27 and the size and number of teeth 46 provided on intermediate-drive belt sprocket 40, crank belt sprocket 48, intermediate-to-crank belt sprocket 45 and drive belt sprocket 37 will determine the speed of reciprocation, or stroke of walking beam 13. Generally, drive pulley 27, drive belt sprocket 37, intermediate-to-crank belt sprocket 45, intermediate-to-drive belt sprocket 40 and crank belt sprocket 48 are chosen and sized to produce from about 6 to about 17 strokes per minute of walking beam 13, depending upon the desired application. One such stroke consists of a complete upward and downward cycle of the walking beam 13. Adjustment of the rate of the walking beam stroke is generally accomplished by choosing a drive pulley 27 of selected diameter once the desired sizing of drive belt sprocket 37, intermediate-to-crank belt sprocket 45, intermediate-to-drive sprocket 40 and crank belt sprocket 48 is accomplished. In a preferred embodiment of the invention drive belt sprocket 37 is provided with 34 teeth having a selected pitch, and cooperating intermediate-to-drive belt sprocket 40 is fitted with 192 teeth having the same pitch, to create an input or drive ratio of 5.65:1. Accordingly, a drive toothed belt 38 is selected having belt grooves 39 which are compatible with the teeth 46 of intermediate-to-drive belt sprocket 40 and teeth 46 of drive belt sprocket 37. Furthermore, intermediate-to-crank belt sprocket 45 is provided with 38 teeth having a selected pitch, while crank belt sprocket 48 is fitted with 192 teeth of the same pitch in order to facilitate an output ratio of 5.05:1. An intermediate toothed belt 47 having belt grooves 39 which register precisely with the teeth 46 of intermediate-to-crank belt sprocket 45, and teeth 46 on crank belt sprocket 48 is therefore chosen on the low speed side of toothed belt drive transmission 26. This sizing of drive belt sprocket 37, intermediate-to-crank belt sprocket 45, intermediate-to-drive belt sprocket 40 and crank belt sprocket 48 facilitates a high speed input to low speed output ratio of 28.53:1, and establishes a stroke rate of about twelve strokes per minute of walking beam 13 where drive pulley 27 is driven at a rate of 342.36 revolutions per minute. It will be further appreciated by those skilled in the art that intermediate-to-drive belt sprocket 40 is smaller in diameter than crank belt sprocket 48, yet in a preferred embodiment of the invention both sprockets are provided with 192 teeth. The difference in size, and the equality of the number of teeth is compatible due to the difference in pitch of the teeth.

The toothed belt drive transmission of this invention is characterized by great flexibility and convenience and is also capable of reducing maintenance costs and pump unit outage time. Referring again to the drawing, since the belt grooves 39 of drive toothed belt 38 and intermediate toothed belt 47 are designed to mesh with teeth 46 of drive belt sprocket 37 and the teeth 46 of intermediate-to-drive belt sprocket 40, and with the teeth 46 of intermediate-to-crank belt sprocket 45 and the teeth 46 of crank belt sprocket 48, respectively, the transmission of power from drive pulley 27 to crank 7 is smooth, positive and quiet, and the unit operates without the necessity of internal lubrication. Furthermore, failure of either drive toothed belt 38 or intermediate toothed belt 47 simply requires replacement of the defective belt to place the unit in working order, whereas as heretofore noted, failure of a gear or other part in gear reducer 3 generally requires removal of the entire gear reducer unit and transportation of the unit to a repair shop, resulting in considerable down time of conventional pumping unit 1. Replacement of drive toothed belt 38 is easily accomplished by loosening and manipulating belt tensioners 25, mounted on vertical frame 30 and in contact with drive shaft pillar bearings 31 to loosen the belt. Removal of intermediate toothed belt 47 is accomplished in a similar manner, with the additional requirement of either removing the end of intermediate shaft 42 opposite intermediate-to-drive belt sprocket 40 from the cooperating intermediate shaft pillar bearing 43, and the end of crank shaft bearing 50 from one of crank shaft pillar bearings 43, or unbolting and raising the pillar bearings from base frame 44 to facilitate removal and replacement of the belt. In a preferred embodiment of the invention drive toothed belt 38 is slightly undersized, preferably in width, or deliberately weakened, in order to insure that it will fail before intermediate toothed belt 47 under circumstances where the down hole pump sticks or another malfunction occurs to prevent movement of the sucker rod string. This is done in order to minimize the incidence of changing intermediate toothed belt 47 and reduce pumping unit outage time.

The toothed belt drive transmission of this invention is highly compact and efficient, and yet easily maintained since the high speed, or drive shaft 29 is positioned above the low speed, or intermediate shaft 42. As heretofore described, the drive belts are easily replaced in a minimum of time, and all component parts are easily accessible for maintenance. Generally, the transmission can be quickly and easily repaired in the field without the necessity of moving it to a repair shop, resulting in a significant savings in maintenance costs and reduction in unit down time. In addition, it will be appreciated that relatively small sprockets can be used in the toothed belt transmission in comparison to conventional V-belt units due to the high friction and minimum slippage characteristics of the toothed belts utilized. In a most preferred embodiment of the invention the toothed belts are flexible and endless, and are manufactured of reinforced rubber or a similar compound. As heretofore described, the belt grooves are fitted to the pitch of the sprocket teeth to insure a smooth transmission of power. However, it will be appreciated by those skilled in the art that other inside face configurations can be formed in the belts to match alternative sprocket force designs and configurations as desired.

Accordingly, having described my invention with the particularly set forth above, what is claimed is:

1. A toothed belt drive transmission for oil field pumping units comprising:
(a) a frame;
(b) a first shaft journalled for rotation in said frame;
(c) a drive pulley carried by said first shaft in fixed relationship and cooperating with a drive means for rotating said first shaft at a selected speed;
(d) first sprocket means carried by said first shaft in spaced relationship from said drive pulley;
(e) a second shaft journalled for rotation in said frame and positioned beneath said first shaft and essentially parallel to said first shaft;
(f) second sprocket means carried by said second shaft in fixed relationship and in alignment with said first sprocket means, and a first endless sprocket belt cooperating with said first sprocket means and said second sprocket means to effect rotation of said second sprocket means responsive to rotation of said drive means;
(g) third sprocket means carried by said second shaft in spaced relationship from said second sprocket means;
(h) a third shaft journalled for rotation in said frame in essentially parallel relationship to said first shaft and said second shaft; and
(i) fourth sprocket means carried by said third shaft in fixed relationship and in alignment with said third sprocket means, and a second endless sprocket belt cooperating with said third sprocket means and said fourth sprocket means to effect rotation of said fourth sprocket means and said third shaft responsive to rotation of said drive pulley.

2. The toothed belt drive transmission of claim 1 further comprising a disk brake having a normally open caliper mounted on said frame and a disk carried by said first shaft in fixed relationship and in rotational registration with said normally open caliper, and brake actuating means cooperating with said normally open caliper whereby said normally open caliper is closed against said disk when said brake actuating means is manipulated.

3. The toothed belt drive transmission of claim 1 wherein said first sprocket means and said second sprocket means are fitted with a first plurality of teeth having a first selected pitch, and said first endless sprocket belt is provided with a plurality of grooves for rotational, matching registration with said first plurality of teeth, and said third sprocket means and said fourth sprocket means are fitted with a second plurality of teeth having a second selected pitch, and said second endless sprocket belt is provided with a plurality of said grooves for rotational, matching registration with said second plurality of teeth.

4. The toothed belt drive transmission of claim 1 further comprising a disk brake having a normally open caliper mounted on said frame and a disk carried by said first shaft in fixed relationship and in rotation registration with said normally open caliper, and brake actuating means cooperating with said normally open caliper whereby said normally open caliper is closed against said disk when said brake actuating means is manipulated, and wherein said first sprocket means and said second sprocket means are fitted with a first plurality of teeth having a first selected pitch, and said first endless sprocket belt is provided with a plurality of grooves for rotational, matching registration with said first plurality of teeth, and said third sprocket means and said fourth sprocket means are fitted with a second plurality of teeth having a second selected pitch, and said second endless sprocket belt is provided with a plurality of said grooves for rotational, matching registration with said second plurality of teeth.

5. The toothed belt drive transmission of claim 1 wherein said frame is further characterized as a generally horizontally disposed base and a vertical frame mounted on said base in vertical relationship, and further comprising:
(a) a first pair of bearings mounted on said vertical frame in spaced relationship and rotatably carrying said first shaft;
(b) a second pair of bearings mounted on said base in spaced relationship below said first pair of bearings, and rotatably carrying said second shaft; and
(c) a third pair of bearings mounted on said base in spaced relationship and rotatably carrying said third shaft.

6. The toothed belt drive transmission of claim 1 wherein said frame is further characterized as a generally horizontally disposed base and a vertical frame mounted on said base in vertical relationship, and said first sprocket means and said second sprocket means are fitted with a first plurality of teeth having a first selected pitch, and said first endless sprocket belt is provided with a plurality of grooves for rotational, matching registration with said first plurality of teeth, and said third sprocket means and said fourth sprocket means are fitted with a second plurality of teeth having a second selected pitch, and said second endless sprocket belt is provided with a plurality of said grooves for rotational, matching registration with said second plurality of teeth; and further comprising:
(a) a disk brake having a normally open caliper mounted on said vertical frame and a disk carried by said first shaft in fixed relationship and in rotational registration with said normally open caliper, and brake actuating means cooperating with said normally open caliper whereby said normally open caliper is closed against said disk when said brake actuating means is manipulated;
(b) a first pair of pillar block bearings mounted on said vertical frame in spaced relationship and rotatably carrying said first shaft;
(c) a second pair of pillar block bearings mounted on said base in spaced relationship below said first pair of pillar block bearings, and rotatably carrying said second shaft; and
(d) a third pair of pillar block bearings mounted on said base in spaced relationship and rotatably carrying said third shaft.

7. A toothed belt drive transmission for pumping units in the oil field comprising:
(a) a horizontally positioned base and an upward-standing frame carried by said base;
(b) a horizontally mounted drive shaft journalled for rotation in said frame;
(c) a drive pulley carried by said drive shaft in fixed relationship;
(d) a drive belt sprocket having a plurality of sprocket teeth and carried by said drive shaft in spaced relationship from said drive pulley;
(e) a horizontally oriented intermediate shaft journalled for rotation in said base and positioned beneath said drive shaft and in essentially parallel relationship to said drive shaft;
(f) an intermediate-to-drive belt sprocket having a plurality of intermediate-to-drive belt sprocket teeth, and attached to said intermediate shaft in fixed relationship and in alignment with said drive belt sprocket, and an endless drive toothed belt having a plurality of belt grooves in the inside face fitted to a portion of said sprocket teeth of said drive belt sprocket and to said intermediate-to-drive belt sprocket teeth of said intermediate-to-drive belt sprocket;
(g) an intermediate-to-crank belt sprocket having a plurality of intermediate-to-crank belt sprocket teeth and carried by said intermediate shaft in spaced relationship from said intermediate-to-drive belt sprocket;
(h) a crank shaft journalled for rotation in said base; and
(i) a crank belt sprocket having a plurality of crank belt sprocket teeth and attached to said crank shaft in fixed relationship and in alignment with said intermediate-to-crank belt sprocket and an endless intermediate toothed belt having a plurality of belt grooves in the inside face fitted to a portion of said intermediate-to-crank belt sprocket teeth of said intermediate-to-crank belt sprocket and said crank belt sprocket teeth of said crank belt sprocket.

8. The toothed belt transmission of claim 7 wherein said sprocket teeth and said intermediate-to-drive belt sprocket teeth are characterized by a first selected pitch, and said intermediate-to-crank belt sprocket teeth and said crank belt sprocket teeth are characterized by a second selected pitch.

9. The toothed belt transmission of claim 6 wherein said first endless sprocket belt and said second endless sprocket belt are characterized as endless, flexible belts having contoured inner contact faces and formed of a reinforced rubber-like compound.

10. The toothed belt transmission of claim 8 wherein said endless drive toothed belt and said endless intermediate toothed belt are characterized as endless, flexible belts having contoured inner contact faces and formed of a reinforced rubber-like compound.

* * * * *